(12) United States Patent
Huang et al.

(10) Patent No.: US 9,443,314 B1
(45) Date of Patent: Sep. 13, 2016

(54) HIERARCHICAL CONDITIONAL RANDOM FIELD MODEL FOR LABELING AND SEGMENTING IMAGES

(75) Inventors: Qixing Huang, Stanford, CA (US); Mei Han, Palo Alto, CA (US); Bo Wu, Alhambra, CA (US); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1149 days.

(21) Appl. No.: 13/434,515

(22) Filed: Mar. 29, 2012

(51) Int. Cl.
*G06K 9/62* (2006.01)
*G06T 7/00* (2006.01)
*G06K 9/00* (2006.01)

(52) U.S. Cl.
CPC ............. *G06T 7/0081* (2013.01); *G06K 9/628* (2013.01); *G06K 9/6218* (2013.01); *G06T 7/0087* (2013.01); *G06K 9/00664* (2013.01); *G06K 9/6256* (2013.01); *G06T 2207/20016* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2008/0304740 | A1* | 12/2008 | Sun | G06K 9/3233 382/168 |
| 2009/0316988 | A1* | 12/2009 | Xu | G06K 9/6256 382/173 |
| 2010/0040285 | A1* | 2/2010 | Csurka | G06K 9/00624 382/170 |
| 2011/0200230 | A1* | 8/2011 | Luke | G06K 9/00791 382/103 |

OTHER PUBLICATIONS

Huang, Qixing, et al. "A hierarchical conditional random field model for labeling and segmenting images of street scenes." Computer Vision and Pattern Recognition (CVPR), 2011 IEEE Conference on. IEEE, 2011. 10 pages.*
He, Xuming, Richard S. Zemel, and Debajyoti Ray. "Learning and incorporating top-down cues in image segmentation." Computer Vision-ECCV 2006. Springer Berlin Heidelberg, 2006. 338-351. 14 pages.*
Ladicky, L'ubor et al. "Associative hierarchical crfs for object class image segmentation." Computer Vision, 2009 IEEE 12th International Conference on. IEEE, 2009. 10 pages.*
Liu, Ming-Yu, et al. "Entropy rate superpixel segmentation." Computer Vision and Pattern Recognition (CVPR), 2011 IEEE Conference on. IEEE, 2011. 10 pages.*
Fulkerson, Brian, Andrea Vedaldi, and Stefano Soatto. "Class segmentation and object localization with superpixel neighborhoods." Computer Vision, 2009 IEEE 12th International Conference on. IEEE, 2009. 8 pages.*
Gould, Stephen, et al. "Multi-class segmentation with relative location prior." International Journal of Computer Vision 80.3 (2008): 300-316. 17 pages.*

(Continued)

*Primary Examiner* — Sumati Lefkowitz
*Assistant Examiner* — Ryan P Potts
(74) *Attorney, Agent, or Firm* — Lerner, David, Littenberg, Krumholz & Mentlik, LLP

(57) ABSTRACT

An image processing system automatically segments and labels an image using a hierarchical classification model. A global classification model determines initial labels for an image based on features of the image. A label-based descriptor is generated based on the initial labels. A local classification model is then selected from a plurality of learned local classification model based on the label-based descriptor. The local classification model is applied to the features of the input image to determined refined labels. The refined labels are stored in association with the input image.

15 Claims, 5 Drawing Sheets

(56) References Cited

OTHER PUBLICATIONS

Kumar, Sanjiv, and Martial Hebert. "A hierarchical field framework for unified context-based classification." Computer Vision, 2005. ICCV 2005. Tenth IEEE International Conference on. vol. 2. IEEE, 2005. 8 pages.*

Comaniciu, D., "Mean Shift: A Robust Approach Toward Feature Space Analysis," *IEEE Transactions on Pattern Analysis and Machine Intelligence*, 24(5):603-619, May 2002.

Galleguillos, C., et al., "Object Categorization using Co-Occurrence, Location and Appearance," *IEEE Conference on Computer Vision and Pattern Recognition*, pp. 1-8, Jun. 2008.

Hays, J., et al., "Scene Completion Using Millions of Photographs," *ACM Transactions on Graphics*, vol. 26, No. 3, Article 4, 7 pages, Jul. 2007.

He, X., et al., "Multiscale Conditional Random Fields for Image Labeling," *Proceedings of the 2004 IEEE Computer Society Conference on Computer Vision and Pattern Recognition (CVPR'04)*, pp. 695-702, 2004.

Hoiem, D., et al., "Geometric Context from a Single Image," *Proceedings of the Tenth IEEE International Conference on Computer Vision (ICCV'05)*, vol. 1, pp. 654-661, Oct. 2005.

Kohli, P., et al., "Robust Higher Order Potentials for Enforcing Label Consistency," *Int. J. Comput. Vis.* 82:302-324, Jan. 2009.

Ladicky, L., et al., "Graph Cut Based Inference with Co-occurrence Statistics," *ECCV 2010*, Part V, LNCS 6315, pp. 239-253, 2010.

Lazebnik, S., et al., "Beyond Bags of Features: Spatial Pyramid Matching for Recognizing Natural Scene Categories," *Proceedings of the 2006 IEEE Computer Society Conference on Computer Vision and Pattern Recognition (CVPR'06)*, pp. 2169-2178, 2006.

Leordeanu, M., et al., "Efficient MAP Approximation for Dense Energy Functions," *Proceedings of the 23$^{rd}$ International Conference on Machine Learning*, Pittsburgh, PA, pp. 545-552, 2006.

Liu, C., et al., "Nonparametric Scene Parsing: Label Transfer via Dense Scene Alignment," *IEEE Conference on Computer Vision and Pattern Recognition*, pp. 1972-1979, 2009.

Oliva, A., et al., "Building the gist of a scene: the role of global image features in recognition," *Progress in Brain Research* 155:23-36, 2006.

Rabinovich, A., et al., "Objects in Context," *IEEE 11$^{th}$ International Conference on Computer Vision*, pp. 1-8, Oct. 2007.

Russell, B., et al., "LabelMe: A Database and Web-Based Tool for Image Annotation," *Int. J. Comput. Vis.* 77:157-173, 2008.

Shotton, J., et al., "*TextonBoost*: Joint Appearance, Shape and Context Modeling for Multi-class Object Recognition and Segmentation," *ECCV 2006*, Part I, LNCS 3951, pp. 1-15, 2006.

Tighe, J., et al., "SuperParsing: Scalable Nonparametric Image Parsing with Superpixels," *ECCV 2010*, Part V, LNCS 6315, pp. 352-365, 2010.

Torralba, A., et al., "Sharing features: efficient boosting procedures for multiclass object detection," *Proceedings of the 2004 IEEE Computer Society Conference on Computer Vision and Pattern Recognition (CVPR'04)*, pp. 762-769, 2004.

Torralba, A., et al., "Context-based vision system for place and object recognition," *Proceedings of the Ninth IEEE International Conference on Computer Vision (ICCV'03)*, pp. 273-280, 2003.

Toyoda, T., et al., "Random Field Model for Integration of Local Information and Global Information," *IEEE Transactions on Pattern Analysis and Machine Intelligence* 30(8):1483-1489, Aug. 2008.

Veksler, O., et al., "Superpixels and Supervoxels in an Energy Optimization Framework," *ECCV 2010*, Part V, LNCS 6315, pp. 211-224, 2010.

* cited by examiner

HIERARCHICAL CONDITIONAL RANDOM FIELD MODEL FOR LABELING AND SEGMENTING IMAGES

BACKGROUND

1. Field of the Invention

This invention generally relates to image processing and more specifically to labeling images based on their content.

2. Description of the Related Art

Simultaneously segmenting and labeling of images according to their content is a fundamental problem in computer vision. Such technology is important for applications such as content-based retrieval and object recognition. For example, in mapping applications utilizing large database of street view images, it is desirable to have a technique for automatically labeling objects appearing in the images. However, conventional labeling techniques fail to provide sufficient scalability and performance.

SUMMARY

A first embodiment comprises a method for obtaining labels for an input image. A global classification model and a plurality of local classification models for determining image labels representing image content are received. An input image for labeling is also received. The global classification model is applied to features of the input image to determine initial labels for the input image. A local classification model is then selected for applying to the input image from the plurality of local classification models. The selected local classification model is applied to the features of the input image to determine refined labels for the input image. The refined labels are stored in association with the input image.

A second embodiment comprises a method for training a classification model for determining labels for an input image. A plurality of labeled or partially labeled training images are received. Each labeled or partially labeled training image comprises at least one label associated with a pixel in the training image. The label indicates an object class from a plurality of possible object classes associated with the pixel. A global classification model is trained to learn a relationship between features of the training image and associated labels. The plurality of labeled training images are clustered into a plurality of clusters based on label-based descriptors for the images representing label-based image features. A plurality of local classification models are then trained to learn a relationship between features of the training images in each cluster and associated labels. The global classification model and the plurality of local classification models are stored to a storage medium.

A third embodiment comprises a method for generating a label-based descriptor representing a labeled image. An input image is received having a label associated with each pixel. The label indicates a class of objects depicted by the pixel from a predefined set of classes. A positional vector is generated for the input image based on the labels. The positional vector represents positional information pertaining to each of the classes of objects depicted in the input image. An appearance vector is also generated for the input image based on the labels. The appearance vector represents appearance of pixels pertaining to each of the classes of objects depicted in the input image. A label-based descriptor is generated for the input image as a weighted combination of at least the positional vector and the appearance vector.

The figures depict embodiments for purposes of illustration only. One skilled in the art will readily recognize from the following description that alternative embodiments of the structures and methods illustrated herein may be employed without departing from the principles described herein.

DETAILED DESCRIPTION

Overview

An image segmentation and labeling process determines pixel-by-pixel labels for an unlabeled input image, where each label indicates a class of objects depicted by the associated pixel. For example, in a mapping application, images of street view scenes may be segmented and labeled based on the classes: sky, architecture, plant, ground, and miscellaneous (e.g., people, cars, etc.). A hierarchical classification model is used that combines both parametric (i.e., supervised) and non-parametric classification (i.e., unsupervised) techniques. Thus, in addition to learning a global classification model in a parametric training phase based on labeled training images, the training images are also clustered in a non-parametric manner. Then local classification models are learned for each cluster. Beneficially, the hierarchical classification technique provides superior performance and scalability compared to parametric or non-parametric classification techniques used in isolation.

System Architecture

Figure 1:
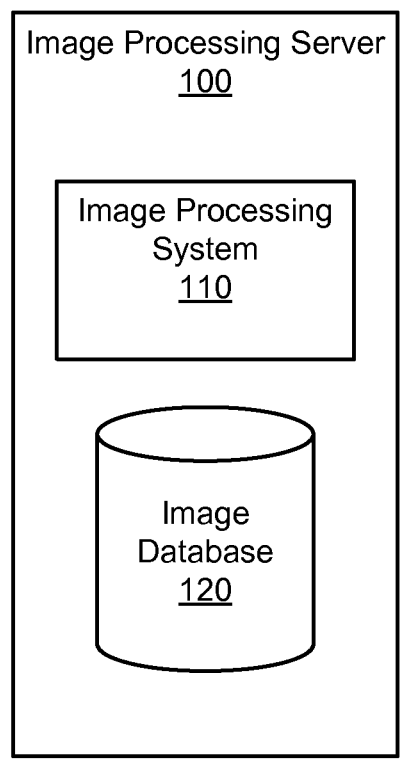
FIG. 1 is a high-level block diagram of an image processing server according to one embodiment.

FIG. 1 is a high-level block diagram of an image processing server 100 according to one embodiment. The server 100 includes an image processing system 110 and an image database 120. Only one server 100, image processing system 110, and image database 120 are shown in FIG. 1 in order to simplify and clarify the description. Embodiments can have multiple ones of these entities. Moreover, the entities can be distributed across multiple machines. For example, the image processing system 110 and database 120 can be distributed across multiple servers.

The image database 120 stores a set of images. The term "image" as used herein includes image data in general, such as individual still image files or frames from a video file. An image I comprises a two-dimensional array of pixels. A particular pixel $I(x,y)$ may be defined differently depending on the color space and encoding format. For example, in a RGB color space, a pixel may be defined as $I(x,y)=\{R, G, B\}$, where R, G, and B are the intensity values of red, green, and blue respectively. In an HSV color space, a pixel may be defined as $I(x,y)=\{H, S, V\}$ where H, S, and V refer to hue, saturation, and value for a given pixel.

The stored images in the image database 120 can be labeled images, unlabeled images, and/or partially labeled images. A labeled image includes labels (e.g., metadata) associated with the image that describes information about the scene and/or objects depicted in the image. In one embodiment, labeled images are labeled on a per-pixel basis. Thus, in this embodiment, a label is associated with each pixel and the label identifies an object or class of objects depicted by that pixel. In contrast, unlabeled images lack these labels and the content of the images are therefore unknown. A partially labeled image includes a portion of the image (e.g., a subset of pixels) that is labeled and a portion that is unlabeled.

The images in the image database 120 may be obtained from a variety of sources. In one particular embodiment, the images are obtained from an organization that produces aerial or street view images of a portion of a city for use with a map system, such as GOOGLE MAPS, GOOGLE STREET VIEW or GOOGLE EARTH. Likewise, images (including video frames) may be obtained from users, e.g. as submitted by a user uploading images to a photo repository such as PICASA WEB, or a video repository such as YOUTUBE or GOOGLE VIDEO. Labeled images or partially labeled images may be labeled manually by a user that indicates what object or class of objects are depicted by various segments of the image. Alternatively, labels may be obtained via an automated labeling process. For example, the image processing system 110 may process unlabeled images to obtain labeled images and store the labeled images back to the image database 120.

In one embodiment, where the labeled or partially labeled images pertain to street view images, each label identifies a pixel as belonging to one of a plurality of object classes which each could include several different objects. For example, the object classes may include: (1) sky (including, for example, sky, cloud, etc.), (2) architecture (including, for example buildings, walls, bridges, etc.), (3) plant (including, for example trees, grass, flowers, bushes, etc.), (4) ground (including, for example, roads, streets, sidewalks, water, earth, etc.), and (5) miscellaneous (including, for example, people, cars, animals, bicycles, etc.). By storing pixel-wise labels identifying the various object classes, the image is effectively segmented into regions based on the image content.

There are several advantages to labeling street scene images using object classes described above. First, the position, shape, and appearance of the object classes primarily determine the semantic information of the street scene image. Second, maintaining a small set of object classes reduces the training time per training image which enables a larger image data set to be incorporated for classification. Third, if desired, additional layers of classification can be added to distinguish the objects within each object class.

Figure 2:
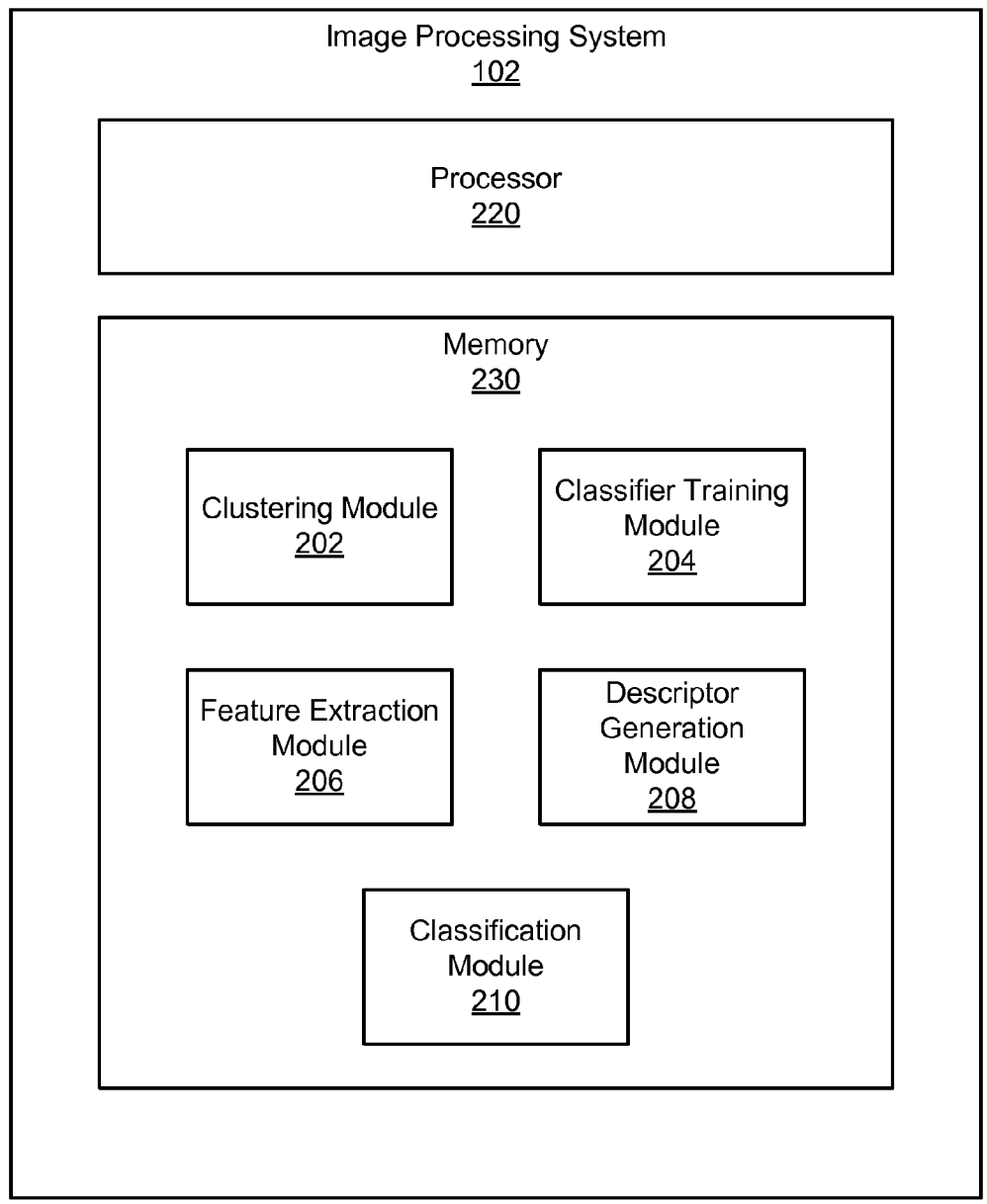
FIG. 2 is a block diagram of an image processing system according to one embodiment.

FIG. 2 is a block diagram of an example embodiment of the image processing system 110. The image processing system 110 comprises a processor 220 and a memory 230. The memory 230 comprises a non-transitory computer-readable storage medium storing a plurality of functional modules embodied as computer-executable program instructions. In operation, the processor 220 loads instructions from the memory 230 and executes the instructions to carry out the functions attributed to the various modules discussed below. In alternative embodiments, the modules can be implemented in hardware, firmware, or a combination of hardware, firmware, and software.

In one embodiment, the memory 230 stores a clustering module 202, a classifier training module 204, a feature extraction module 206, a descriptor generation module 208, and a classification module 210. In alternative embodiments, different and/or additional modules may be used than the ones described here. Furthermore, the functions can be distributed among the modules in a different manner than described here.

In a training phase, the classifier training module 204 receives a plurality of labeled and/or partially labeled training images and trains a hierarchical classification model (e.g., a hierarchical conditional random field (CRF) model) that maps features of the training images to pixel-wise labels. In one embodiment, the hierarchical classification model comprises a global classification model and a plurality of local classification models. The global classification (e.g., a global CRF model) is trained based on a complete set of training images that may have a variety of different appearance characteristics. The local classification models (e.g., local CRF models) each correspond to a cluster of training images, i.e., a subset of training images determined to have similar appearance characteristics. Each local classification model thus maps features of the training images within a particular cluster to their labels. Because each local classification model is trained on a subset of training images having more similar features, these local classification models tend to discriminate better between features than the global classification model. Thus, the hierarchical approach provides a more robust labeling system than other approaches.

The output of the classifier training module 204 is a set of parameters representing the global and local classification models. These models may be applied to label an unlabeled input image according to a parametric classification method in order to map image features to labels as will be described below.

Also in the training phase, the clustering module 202 clusters training images into clusters of semantically similar images based on label-based descriptors representing positional and appearance information for the various object classes depicted in the training images. Each cluster thus contains a subset of semantically-similar training images. The learned clusters can be used to determine a set of training images that have similar appearance characteristics to an unlabeled input image according to a non-parametric classification method, as will be described in further detail below.

In a classification phase, the classification module 210 determines labels for an unlabeled input image by applying the learned hierarchical classification model to the input image. The classification module 210 first applies the global classification model to map features of the input image to an initial set of labels. The classification module 210 then determines a cluster of training images most closely associated with the input image based on the initial labels. The classification model then applies the local classification model associated with that cluster to the input image to determine a refined set of labels for the input image. Thus, the classification module 210 combines parametric and non-parametric classification methods in order to achieve a set of labels for an input image.

The feature extraction module 206 extracts features from images that represent appearance of the images. Features extracted from labeled or partially labeled images are used by the classifier training module 204 to train the global classification model. Furthermore, features extract from an unlabeled image (e.g., an input image) are inputted to the global and local classification models to determine pixel-wise labels for the input image.

The descriptor generator module 208 generates a label-based descriptor for an image representing positional and appearance information pertaining to the various object classes depicted in the image. In the training phase, the label-based descriptors are used to cluster training images having similar label-based descriptors. Furthermore, a label-based descriptor can be generated for an input image based on initial labels obtained from the global classification model. The label-based descriptor is then used to determine a cluster of training images most similar to the input image, and a local classification model can be selected based on this determination. A process for generating a label-based descriptor for an image is described in further detail below.

Operation and Use

Training Stage

Figure 3:
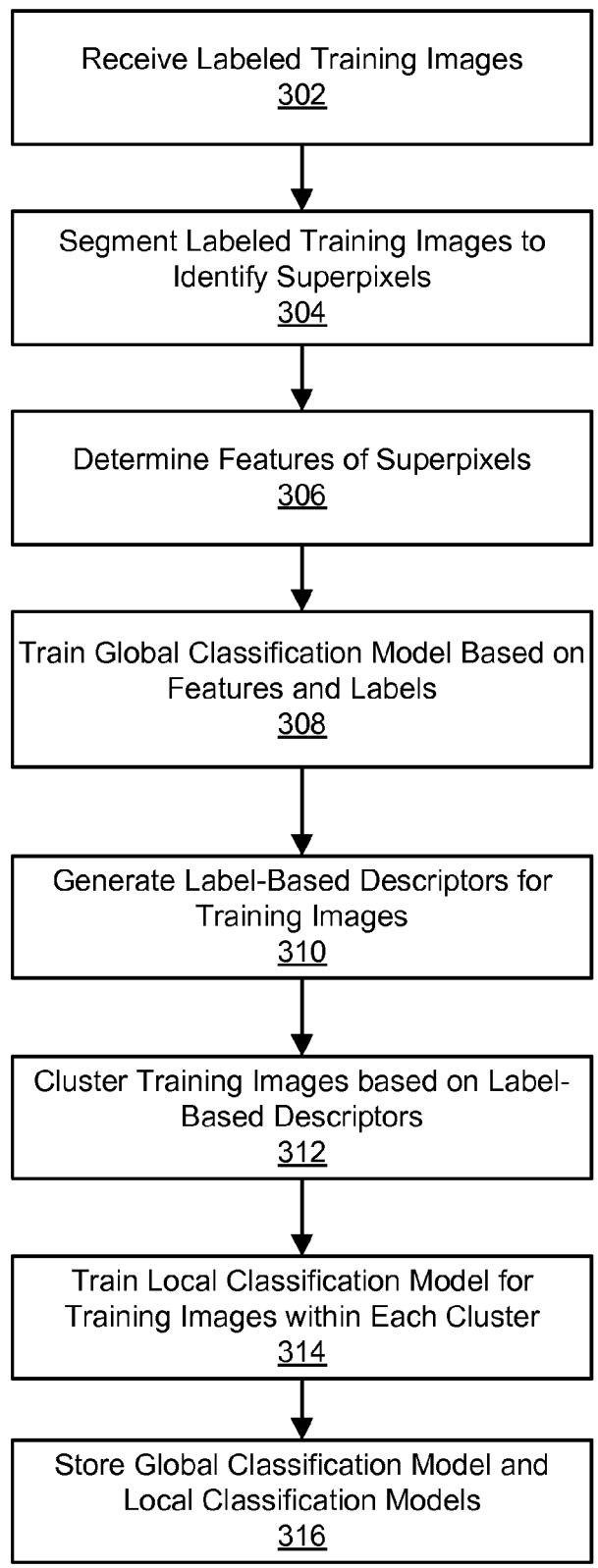
FIG. 3 is a flowchart illustrating a process for training a hierarchical classification model for labeling images according to one embodiment.

FIG. 3 is a flowchart illustrating an embodiment of a process for training a hierarchical classification model (e.g., a hierarchical conditional random field model) for labeling images. In one embodiment, the process of FIG. 3 is performed by the image processing system 102 described above. For example, the process of FIG. 3 may be performed by the processor 220 executing the various modules stored in the memory 230 to achieve the functions described.

A set of labeled and/or partially labeled training images is received 302. In one embodiment, the training set includes a large number of images (e.g., 1000 or more images) although smaller training sets can be used for certain applications. Furthermore, in one embodiment, the training images include sufficient instances of images with different spatial layouts to adequately train a classifier. For example, in one embodiment, the training images includes a variety of street scene images with pixels labeled according to their object class (e.g., sky, architecture, plant, ground, or miscellaneous) and each training image includes at least two labels from the set of object classes. Ensuring that each training image has at least two different labels enables extraction of contextual information during the training process.

Image Segmentation

The labeled training images are then segmented 304 to identify "super-pixels." A super-pixel comprises a segment of the image made up of a spatially contiguous group of one or more pixels. The pixels within a super-pixel each have the same label, although multiple super-pixels may also have the same label. In one embodiment, for example, each image is divided into a predetermined number of super-pixels (e.g., approximately 400 super-pixels), where the set of super-pixels of an image I is denoted by $\mathcal{I}_s$. For each super-pixel $s \in \mathcal{I}_s$, a set of neighboring super-pixels $\mathcal{N}(s)$ is computed. In one embodiment, $\mathcal{N}(s)$ includes two types of super-pixels: (1) those that are adjacent to s and (2) those that are not adjacent to s but are in the neighborhood of s (e.g., within a predefined radius or falling within a predefined number of closest super-pixels). The second type of neighboring super-pixels are used to incorporate contextual information at a larger scale.

Generation of Feature Vectors

Next, features of the super-pixels are determined 306. In one embodiment, both unary feature vectors and pair-wise feature vectors are determined. In one embodiment, a unary feature vector is separately determined for each super-pixel. The unary feature vector represents, for example, various appearance characteristics of the super-pixel useful for training a classifier. These feature vectors may be related to, for example, color distributions of pixels within the super-pixel, location of the super-pixel within the image, local gradient information, etc. For example, in various embodiments, the feature vector for a super-pixel can represent one or more of HSV color information, location of the super-pixel center, and scale-invariant feature transform (SIFT) feature descriptors at scales of, for example, $2^i$ where $4 \leq i \leq 7$. Using multiple scales can be beneficial in accounting for varying sizes of the same object in different images. In one embodiment, a basic multi-dimensional (e.g., 517 dimensions) feature vector $x_s$ is formed per super-pixel s.

Optionally, additional feature vectors may be added such as, for example, vectors connecting two feature vectors of different objects classes. These additional feature vectors are beneficial in that they tend to describe characteristics separating the two classes, thus leading to a more discriminative classifier. For example, in one embodiment, N feature vectors $p_i$ are randomly selected from a first class c of super-pixels and N feature vectors $q_i$ are randomly selected from a second class c' of superpixels. The first n (e.g., n=15) eigenvectors of the following function are computed:

$$M_{cc'} = \sum_{i=1}^{N} (p_i - q_i) \cdot (p_i - q_i)^T \quad (1)$$

These n eigenvectors are added as additional feature vectors to the original set of unary feature vectors. For example, in one embodiment, approximately 150 additional feature vectors from 10 different pairs of classes (out of, for example, 5 classes) are added. These additional feature vectors may increase the pixel-wise classification accuracy by 4% or higher under certain operating conditions. The set of unary feature vectors is denoted as $x_s$ for each super-pixel s.

The pair-wise feature vectors provide contextual information describing the relative color, positional information, and/or gradient information between neighboring super-pixels. For each pair of neighboring super-pixels (s, s') a pair-wise feature vector denoted by $y_{ss'}$ is defined as $y_{ss'} = (x_s, x_{s'})$. Furthermore, in one embodiment, additional feature vectors are added to set of pair-wise feature vectors based on equation (1) above.

Training Global Classification Model

After generating the unary feature vectors $x_s$ and pair-wise feature vectors $y_{ss'}$ for each training image, a global classification model is trained 308 to provide a mapping between the features vectors and the pixel-wise labels of the training images. Thus, for example, in one embodiment, the global classification model associates each super-pixel s with a label $c_s$ in the set of possible object classes (e.g., sky, architecture, plant, ground, miscellaneous). In one embodiment, parameters of the global classification model are determined by minimizing the following objective function:

$$E(c, \theta) = \sum_{s \in I_s} (E_1(c_s; x_s, \theta_1)) + \sum_{s' \in N(s)} (E_2(c_{s'}, c_s; y_{ss'}, \theta_2)) \quad (2)$$

where the unary term $E_1$ represents the consistency between the features $x_s$ of super-pixel s and its label $c_s$, the pair-wise term $E_2$ represents consistency between neighboring super-pixel labels $c_s$ and $c_{s'}$ given pair-wise feature $y_{ss'}$. The model parameters are $\theta = (\theta_1, \theta_2, \lambda)$ where $\lambda$ controls the contribution of the pair-wise term.

In one embodiment, the objective E(c, θ) is optimized using an efficient quad-relaxation technique. The resulting labeling c implicitly defines a segmentation of the input image, with segment boundaries lying between each pair of adjacent super-pixels.

The unary energy term $E_1$ of Eq. (2) evaluates a classifier. The classifier takes the feature vector $x_s$ of a super-pixel as input, and returns a probability distribution of labels for that super-pixel: $P(c|x, \theta_1)$. In one embodiment, for example, a JointBoost classifier is used although other classifiers can be used in different implementations. In one embodiment, the unary energy $E_1$ of a label $c_s$ is equal to its negative log-probability:

$$E_1(c_s; x_s, \theta_1) = -\log P(c_s | x_s, \theta_1) \quad (3)$$

A classification model based on the unary energy term alone (without the pair-wise energy term $E_2$) would generally be able to obtain a preliminary outline of objects when applied to an unlabeled input image. However, a number of pixels would still likely be misclassified. This is because the unary term $E_1$ does not consider consistency of labels across neighboring super-pixels and the spatial relationship between different objects. Thus, the global classification model also includes the pair-wise energy term $E_2$ to take contextual information into account. For example, observing that a sky object is generally coherent and a sky object is very unlikely to be under a building object, an improved model for labeling pixels can be achieved by incorporating the pair-wise energy term $E_2$.

In one embodiment the pair-wise energy term $E_2$ also evaluates a JointBoost classifier although other classifiers can be used in different implementations. In one embodiment, the pair-wise energy of a pair of labels $c_s$ and $c_{s'}$ is given by:

$$E_2(c_s, c_{s'}; y_{ss'}, \theta_2) = -\lambda \log P(c_s, c_{s'} | y_{ss'}, \theta_2) \quad (4)$$

In the above equation, λ represents the relative contribution of the pair-wise energy term $E_2$ to the overall objective function E of the global classification model. In one embodiment, the weighting coefficient λ can be learned using a validation image set comprising a set of labeled and/or partially labeled images different from those in the training data set. For example, different values of λ may be tried and a value of λ having the smallest testing error may be chosen.

Generation of Label-Based Descriptors

In step 310, a label-based descriptor is generated for each training image. In one embodiment, the label-based descriptor captures semantic information of an image such as the position, appearance, and shape of each of the object classes depicted in the image. For example, in one embodiment, the label-based descriptor describes in a compact way, the position, appearance, and shape of the object classes from the set {sky, architecture, plant, ground, and miscellaneous}.

In one embodiment, prior to generating the label-based descriptors, the global classification model may first be applied to partially-labeled images in the training set in order to obtain a complete set of initial labels for these images. Then, the label-based descriptor can be generated for the partially-labeled images based on these initial labels.

To encode position information of each object class in a given image I, the image I is subdivided into a uniform $n_p \times n_p$ grid of cells g. Within each grid cell $g_{ij}$ the distribution $p_{ijk}$ of each object class $c_k \in \mathcal{L}$ is evaluated where $\mathcal{L} = \{c_k\}$ is the set of k object classes. The cell coverage information is collected into a vector $d_I^p$ of length $Kn_p^2$. Picking the grid size value $n_p$ is a tradeoff between descriptiveness and stability of this representation. For example, a larger $n_p$ makes $d_I^p$ capture positional information more precisely while a smaller $n_p$ makes $d_I^p$ less sensitive to image displacement and classification errors. In one embodiment, a value $n_p=4$ is used.

Similar to positional information, the appearance information is encoded by evaluating a mean color $\bar{c}_{ijk} = (\bar{r}_{ijk}, \bar{g}_{ijk}, \bar{b}_{ijk})$ of each object class $c_k$ within each cell $g_{ij}$. To stabilize the mean color statistics, each mean color $\bar{c}_{ijk}$ is scaled as $p_{ijk} \bar{c}_{ijk}$. Again, all mean colors $\bar{c}_{ijk}$ are collected into a vector $d_I^c$ of length $3Kn_p^2$.

Finally, the label-based descriptor of image I is given by: $d_I = (d_I^p, w_c d_I^c)$ where $w_c$ weighs the importance of the appearance information. Thus, the label-based descriptor $d_I$ for a training image I represents a weighted vector of the positional information and color information pertaining the various object classes depicted in the image. In one embodiment the weight $w_c$ is set to 1 by default. If, for example, K=5 (i.e., five superclasses of objects), the label-based descriptor described above has 320 dimensions. In alternative embodiments, a different label-based descriptor may be used.

Clustering Based on Label-Based Descriptors

Training examples are next clustered 312 based on the label-based descriptors. As described above, the label-based descriptors represent image features such as color and position information related to labels. Using the label-based descriptor, each training image is represented as a point $R^N$ where N is the dimensionality of the label-based descriptor. In one embodiment, clustering is performed directly using the original label-based descriptors in the N dimensional space. Alternatively, the dimensionality of the label-based descriptor can first be reduced prior to clustering. Clustering in a projected space reduces the chances of obtaining clusters as isolated points. For example, in one embodiment, a singular value decomposition reduces the dimension of the label-based descriptors to M (e.g., M=2). The projected label-based descriptor of image I is denoted by $\bar{d}_I$.

A clustering algorithm (e.g., a mean-shift clustering algorithm) is employed to group training images into clusters based on the label-based descriptors. In one embodiment, the clustering algorithm returns K clusters of images $C_i$ where $1 \leq i \leq K$. For each cluster $C_i$, the center $m_i$ and variance $\sigma_i$ are compacted as:

$$m_i = \frac{\sum_{I \in C_i} \bar{d}_I}{|C_i|} \quad (5)$$

$$\sigma_i = \rho\left( \frac{\sum_{I \in C_i} (\bar{d}_I - m_i)(\bar{d}_I - m_i)^T}{|C_i|} \right) \quad (6)$$

where ρ(A) evaluates the maximum eigenvalue of a matrix A.

To ensure that each cluster includes sufficient number of training images, each cluster $C_i$ can be enlarged by including every image I whose association weight to $C_i$ is:

$$w(I, C_i) = \exp\left(-\frac{\|\bar{d}_I - m_i\|^2}{2\sigma_i^2}\right) < \delta \quad (7)$$

For example, in one embodiment, δ=0.1.

Training Local Classification Models

Next, for each cluster $C_i$, a local classification model is then trained 314 for training images within the cluster. The association weight $w(I, C_i)$ of each image I naturally describes how close this image is to cluster $C_i$. Therefore, the labeled instances are weighted by $w(I, C_i)$ when learning the local classification model. The local classification models can be learned using the same technique as used to train the global classification model, except only a subset of training images are used (i.e., those within the cluster associated with the local classification model).

An issue associated with mean-shift clustering described above is how to set the clustering parameter σ that controls the granularity of the clustering (Note that this parameter σ refers to the general parameter σ used in mean-shift and many other segmentation/clustering algorithm and is distinct from the variance $σ_i$ in Eq. 6). Using a small number of clusters would make the local classification model of each cluster under-fitted while using a large number of clusters would make the local classification model of each cluster over-fitted. Thus, in one embodiment, σ is computed such that it results in clusters that maximize the classification accuracy of the hierarchical classification model. In one implementation, a predefined number (e.g., 8) of candidate σs are chosen that are uniformly sampled between d/16 and d/2 where d is the diameter of the projected label-based descriptor of all training images. In one embodiment, σ is selected as the one that leads to the highest classification accuracy. For example, in one embodiment, a value of σ=d/8 is used.

After training, the global classification model and the plurality of local classification models are stored 316 to a storage medium. In one embodiment, the models are stored in terms of their respective model parameters. For example, values for $θ_1$ and $θ_2$ described above are stored for the global classification model and for each of the local classification models.

Classification Stage

Figure 4:
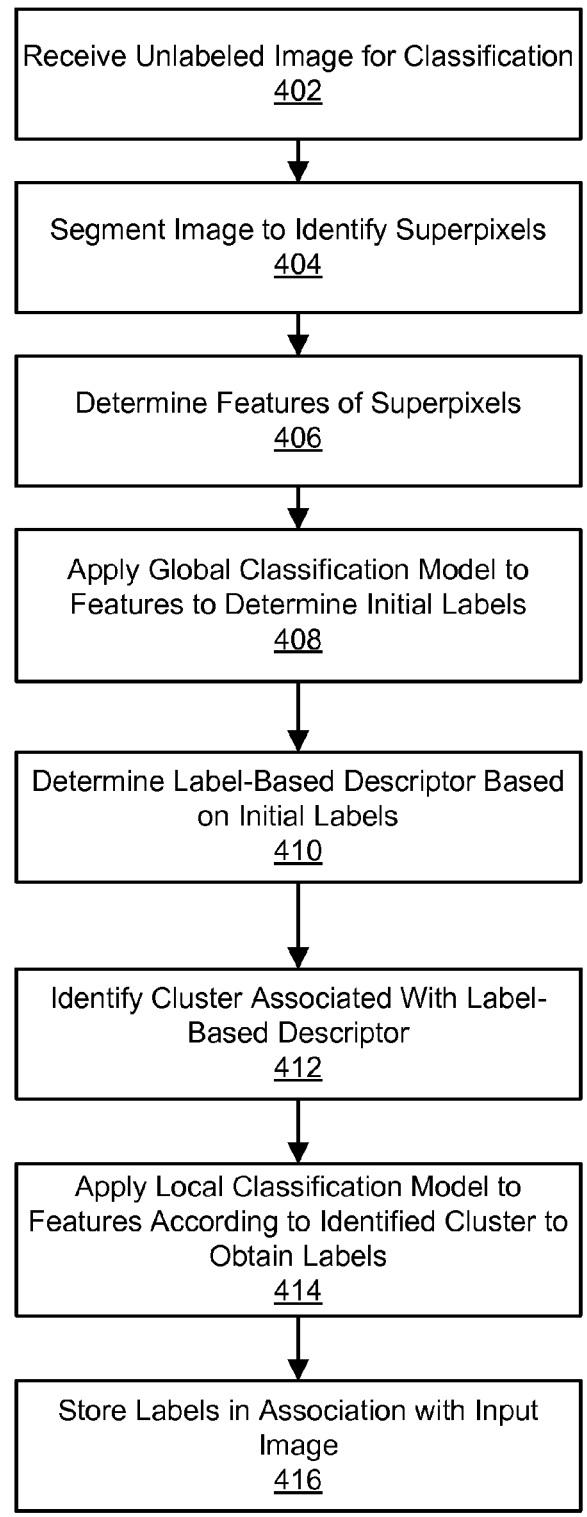
FIG. 4 is a flowchart illustrating a process for labeling an input image using a hierarchical classification model according to one embodiment.

FIG. 4 illustrates an embodiment of a process for acquiring labels for an unlabeled input image. The labels will predict on a pixel-by-pixel basis, which class of objects is depicted by each pixel in the input image I. An unlabeled image I is received 402 for classification. The image I is segmented 404 into a plurality of super-pixels using a process similar or identical to the segmentation process described above for the training images. Furthermore, features are determined 406 for each super-pixel using a process similar or identical to the feature generation process described above for the training images. This yields a set of unary feature vectors describing, for example, color, positional, and/or gradient information pertaining to the super-pixels in the image I, and a set of pair-wise feature vectors describing contextual information pertaining to neighboring super-pixels in the image I. The learned global classification model is then applied 408 to the feature vectors to obtain initial pixel labels for the input image I. A label-based descriptor is then determined 410 based on the initial labels. This label-based descriptor can be determined using a similar or identical process to that described above for the training images, using the initial labels determined from application of the global classification model. Based on the label-based descriptor, a cluster $C_i$ from the set of learned clusters is identified 412 that has the largest association weight $w(I, C_i)$ with the label-based descriptor for the input image I. Then, the local classification model associated with the identifier cluster $C_i$ is applied 414 to the feature vectors of the input image I to determine a refined set of labels for the input image I. These labels are stored 416 in association with the image I.

Two heuristic approaches can optionally be used to accelerate the speed of running the hierarchical classification model. First, as the global classification model is only used to find the corresponding cluster of each input image, fewer decision stumps can be used for the classifier of both the unary term and the pair-wise term. For example, in one embodiment, the number of stumps is reduced by ¾. Such a reduction will, under certain conditions, reduce the pixel-wise classification accuracy by only 0.05% or less. Second, when optimizing the local classification models, the process could start from using labeled results of the global classification model. This can decrease the total running time of the optimization process for the hierarchical classification model by about 15% under certain operational conditions.

Application to Street View Content Identification

As described above, in one embodiment, the hierarchical classification technique can be used to determine pixel-by-pixel labels for unlabeled street view images. This would allow, for example, a mapping application to automatically identify objects depicted in large street view image databases. Such an automated labeling technique is desirable because street view images for such applications are acquired in very large quantities (e.g., by driving a car along streets and continuously capturing images). The labels may be useful, for example, to identify buildings in the street view images which may then be associated with a particular address, company, or person in the map application. Additionally, for privacy purposes, miscellaneous objects such as people and cars could be automatically blurred or removed from street view images. In one embodiment, license plates appearing in the street view image can be detected and blurred or removed.

Application to Similar Image Search

In an alternative embodiment, the label-based descriptor described above can be used in a similar image search application. The label-based descriptor defined above does not consider the shape of the various depicted objects. Thus, in one embodiment, the label-based descriptor is augmented to take this information into account. To capture shape information, the orientation distribution of the boundaries between each pair of different objects may be evaluated. For stability concerns, a coarse grid $n_e × n_e$ (e.g., $n_e=2$) may be used with $n_b$ bins (e.g., $n_b=4$) for orientation. The edge orientation of each pair of adjacent super-pixels with different object labels are perpendicular to the centroid of the super-pixels. All the counts are collected into a vector $l_b$ of size $K(K-1)/2n_b × n_e^2$. For example in one embodiment, the vector $l_b$ has a size 160 and the dimension of the augmented label-based descriptor becomes 480. Furthermore, in one embodiment, the edge part may be weighted (e.g., as 0.01).

Figure 5:
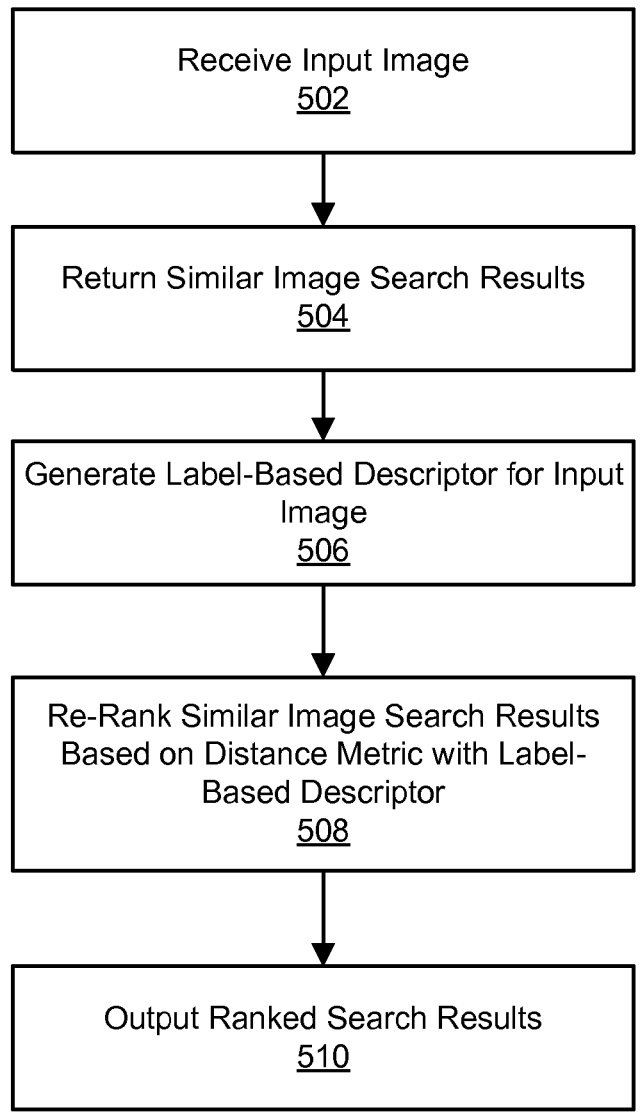
FIG. 5 is a flowchart illustrating a process for re-ranking similar image search results using label-based descriptors according to one embodiment.

An embodiment of a process for refining similar image search results using the label-based descriptor described above is illustrated in FIG. 5. An image query system (e.g., Google Similar Image Search) receives 502 an input image I and returns 504 a set of search results that are similar in appearance to image I. The images in the search result set may have differing degrees of similarity with image I. The query results can therefore be re-ranked based on the label-based descriptor. If the input image I is not already labeled, labels may be acquired for the image using the processes described above. A label-based descriptor is generated 506 for the input image I based on its labels. The label-based descriptor is then compared to label-based descriptors of the search results and the images are re-ranked 508 based on a distance metric between their respective label-based descriptors and the label-based descriptor of the input image I. The ranked images results are then outputted 510 (e.g., for display on a client). Re-ranking the results using the label-based descriptor can beneficially provide significantly more relevant image results based on the semantic information contained in the label-based descriptor.

Additional Applications and Embodiments

In addition to the specific applications described above, the hierarchical classification technique can be applied to other image segmentation and labeling problems that do not necessarily involve street view images. Rather, the classification models can be trained for any set of object classes in a wide variety of image types. Once trained, the classification models can be applied to unlabeled images to segment and label the image based on the depicted object classes.

The above description is included to illustrate the operation of the embodiments and is not meant to limit the scope of the invention. From the above discussion, many variations will be apparent to one skilled in the relevant art that would yet be encompassed by the spirit and scope of the invention.

The invention claimed is:

1. A computer-implemented method for training a classification model for determining labels for an input image, the method comprising:
receiving, by one or more processors, a plurality of labeled or partially labeled training images, wherein each labeled or partially labeled training image comprises at least one label associated with a pixel in the training image, the label indicating an object class from a plurality of possible object classes associated with the pixel;
training, by the one or more processors, a global classification model to learn a global mapping between features of the training images and the labels;
clustering, by the one or more processors, the plurality of labeled training images based on label-based descriptors into a plurality of clusters, the label-based descriptors representing label-based image features;
training, by the one or more processors, a plurality of local classification models to learn a local mapping between features of the training images in each cluster and the labels of the training images in the cluster; and
storing, by the one or more processors, the global classification model and the plurality of local classification models to a storage medium;
wherein training the global classification model comprises:
segmenting each training image into a plurality of super-pixels, each super-pixel comprising a spatially-contiguous block of pixels;
determining the features of each training image from appearance characteristics of the super-pixels; and
training the global classification model based on a set of feature vectors representing the features; and
wherein determining the features of each training image comprises:
determining a unary feature vector for each of the super-pixels in each of the training images, each unary feature vector representing one or both of location of a center of the super-pixel and gradient information of the super-pixel;
determining pair-wise feature vectors representing relative appearance of neighboring super-pixels; and
including the unary feature vectors and the pair-wise feature vectors in the set of features vectors for training the global classification model.

2. The method of claim 1, wherein determining the features of each training image further comprises:
randomly or pseudo-randomly selecting N pixels from the super-pixel belonging to a first class c and N pixels from the super-pixel belonging to a second class c';
determining a set of eigenvectors representing a difference in appearance between the N pixels in the first class c and the N pixels in the second class c'; and
including the set of eigenvectors in the set of feature vectors for training the global classification model.

3. The method of claim 1, wherein training the global classification model comprises:
optimizing an objective function comprising a unary energy term and a pair-wise energy term, the unary energy term representing consistency between the unary feature vectors and the labels, and the pair-wise energy term representing consistency between the labels for the neighboring super-pixels given the pair-wise feature vectors.

4. The method of claim 1, wherein clustering the plurality of labeled training images comprises:
generating a label-based descriptor for each training image;
reducing a dimensionality of the label-based descriptors by projecting the label-based descriptors to a lower dimensional space; and
clustering the plurality of labeled training images in the lower dimensional space.

5. The method of claim 4, wherein generating the label-based descriptor comprises:
determining a positional vector representing positional information for each object class with each training image;
determining an appearance vector representing of appearance information for each object class; and
generating the label-based descriptor as a weighted combination of the positional vector and the appearance vector.

6. The method of claim 1, wherein training the plurality of local classification models comprises:
optimizing an objective function for each cluster of training images to determine local classification parameters based on appearance characteristics and labels of training images within a cluster.

7. A processing system for training a classification model for determining labels for an input image, the processing system comprising:
memory; and
one or more processors operatively coupled to the memory, the one or more processors being configured to:
receive a plurality of labeled or partially labeled training images, wherein each labeled or partially labeled training image comprises at least one label associated with a pixel in the training image, the label indicating an object class from a plurality of possible object classes associated with the pixel;
train a global classification model to learn a global mapping between features of the training images and the labels;
cluster the plurality of labeled training images based on label-based descriptors into a plurality of clusters, the label-based descriptors representing label-based image features;

train a plurality of local classification models to learn a local mapping between features of the training images in each cluster and the labels of the training images in the cluster; and store the global classification model and the plurality of local classification models in the memory;

wherein the one or more processors are configured to train the global classification model by:

segmenting each training image into a plurality of super-pixels, each super-pixel comprising a spatially-contiguous block of pixels;

determining the features of each training image from appearance characteristics of the super-pixels; and training the global classification model based on a set of feature vectors representing the features; and wherein the one or more processors are configured to determine the features of each training image by:

determining a unary feature vector for each of the super-pixels in each of the training images, each unary feature vector representing one or both of location of a center of the super-pixel and gradient information of the super-pixel;

determining pair-wise feature vectors representing relative appearance of neighboring super-pixels; and including the unary feature vectors and the pair-wise feature vectors in the set of features vectors for training the global classification model.

8. The processing system of claim 7, wherein the one or more processors are configured to determine the features of each training image further by:

randomly or pseudo-randomly selecting N pixels from the super-pixel belonging to a first class c and N pixels from the super-pixel belonging to a second class c';

determining a set of eigenvectors representing a difference in appearance between the N pixels in the first class c and the N pixels in the second class c'; and including the set of eigenvectors in the set of feature vectors for training the global classification model.

9. The processing system of claim 7, wherein the one or more processors are configured to train the global classification model by:

optimizing an objective function comprising a unary energy term and a pair-wise energy term, the unary energy term representing consistency between the unary feature vectors and the labels, and the pair-wise energy term representing consistency between the labels for the neighboring super-pixels given the pair-wise feature vectors.

10. The processing system of claim 7, wherein the one or more processors are configured to cluster the plurality of labeled training images by:

generating a label-based descriptor for each training image;

reducing a dimensionality of the label-based descriptors by projecting the label-based descriptors to a lower dimensional space; and clustering the plurality of labeled training images in the lower dimensional space.

11. The processing system of claim 10, wherein the one or more processors are configured to generate the label-based descriptor by:

determining a positional vector representing positional information for each object class with each training image;

determining an appearance vector representing of appearance information for each object class; and generating the label-based descriptor as a weighted combination of the positional vector and the appearance vector.

12. The processing system of claim 7, wherein the one or more processors are configured to train the plurality of local classification models by:

optimizing an objective function for each cluster of training images to determine local classification parameters based on appearance characteristics and labels of training images within a cluster.

13. A non-transitory computer-readable recording medium that stores computer instructions thereon, the computer instructions, when executed by one or more processors, cause the one or more processors to carry out a method for training a classification model for determining labels for an input image, the method comprising:

receiving a plurality of labeled or partially labeled training images, wherein each labeled or partially labeled training image comprises at least one label associated with a pixel in the training image, the label indicating an object class from a plurality of possible object classes associated with the pixel;

training a global classification model to learn a global mapping between features of the training images and the labels;

clustering the plurality of labeled training images based on label-based descriptors into a plurality of clusters, the label-based descriptors representing label-based image features;

training a plurality of local classification models to learn a local mapping between features of the training images in each cluster and the labels of the training images in the cluster; and storing the global classification model and the plurality of local classification models to a storage medium;

wherein training the global classification model comprises:

segmenting each training image into a plurality of super-pixels, each super-pixel comprising a spatially-contiguous block of pixels;

determining the features of each training image from appearance characteristics of the super-pixels; and training the global classification model based on a set of feature vectors representing the features; and wherein determining the features of each training image comprises:

determining a unary feature vector for each of the super-pixels in each of the training images, each unary feature vector representing one or both of location of a center of the super-pixel and gradient information of the super-pixel;

determining pair-wise feature vectors representing relative appearance of neighboring super-pixels; and including the unary feature vectors and the pair-wise feature vectors in the set of features vectors for training the global classification model.

14. The non-transitory computer-readable recording medium of claim 13, wherein clustering the plurality of labeled training images comprises:

generating a label-based descriptor for each training image;

reducing a dimensionality of the label-based descriptors by projecting the label-based descriptors to a lower dimensional space; and clustering the plurality of labeled training images in the lower dimensional space.

15. The non-transitory computer-readable recording medium of claim 13, wherein training the plurality of local classification models comprises:
  optimizing an objective function for each cluster of training images to determine local classification parameters based on appearance characteristics and labels of training images within a cluster.

* * * * *